March 18, 1924.
E. H. MARTIN
ENGINE
Filed Sept. 20, 1922
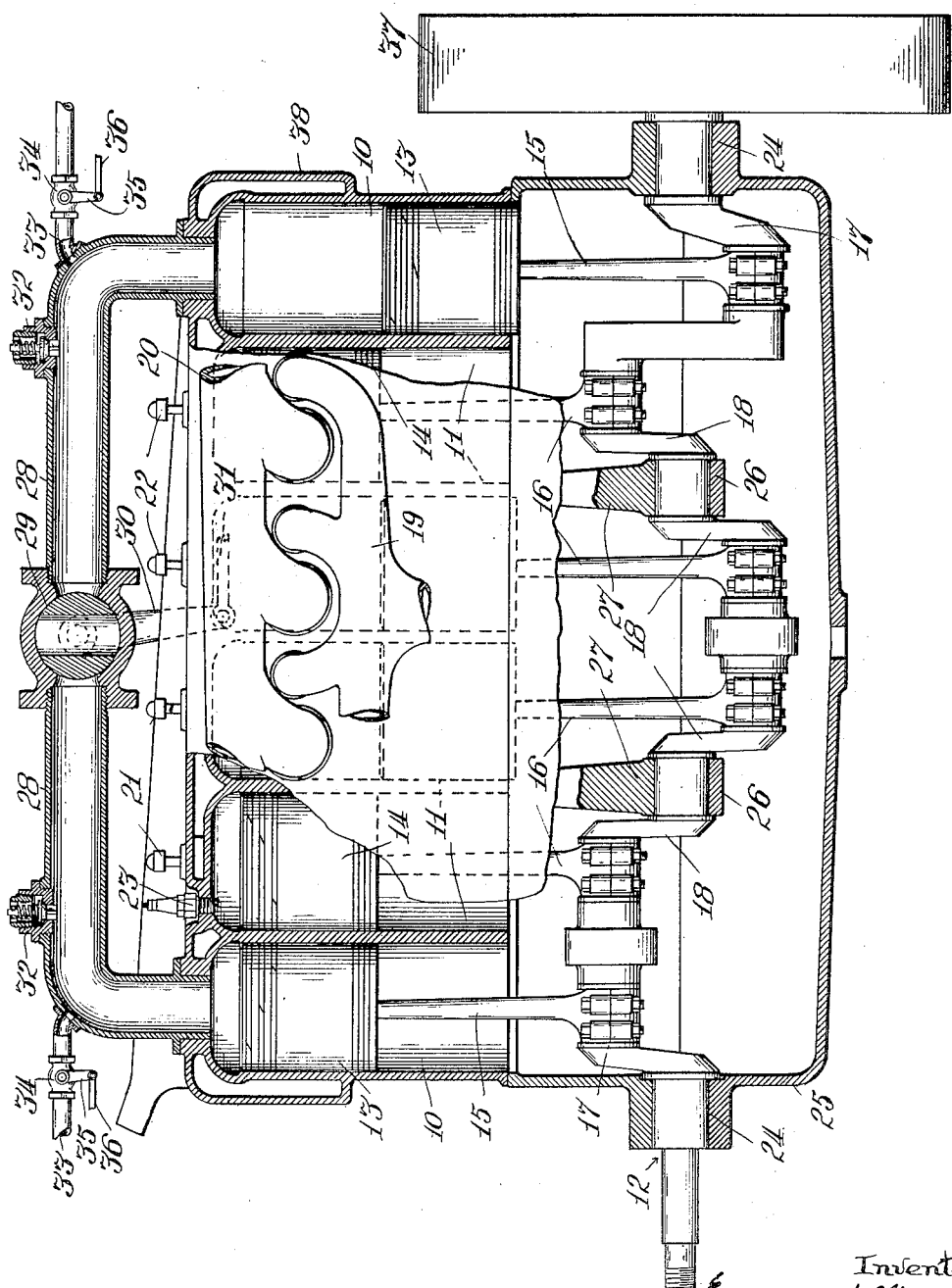
Inventor
Edward H. Martin
By Thomas H. Ferguson
Attorney Patented Mar. 18, 1924.

1,487,347

UNITED STATES PATENT OFFICE.

EDWARD H. MARTIN, OF LOS ANGELES, CALIFORNIA.

ENGINE.

Application filed September 20, 1922. Serial No. 589,317.

*To all whom it may concern:*

Be it known that I, EDWARD H. MARTIN, a citizen of the United States, and a resident of Los Angeles, county of Los Angeles, and State of California, have invented certain new and useful Improvements in Engines, of which the following is a specification.

The present invention relates generally to engines and more particularly to internal combustion engines such as are used in automobiles and other self-propelled vehicles and consists in a novel arrangement of driving and braking cylinders and in certain features of control.

In the past various efforts have been directed toward the production of control systems for engines of the class mentioned which dealt principally with the operation of the engine during the starting and accelerating of the vehicle and paid no particular attention to the retarding and stopping of the same except in so far as the latter might be attained by the use of the usual hand or foot brakes. Some efforts have also been directed to the production of power braking systems in order to bring about a proper handling of the vehicle upon long descents.

The principal object of the present invention is to overcome the defects of the usual braking device by employing braking cylinders capable of producing a heavy braking action directly upon the crank shaft of the engine and then arrange such cylinders with reference to the driving cylinders of the engine so as to produce a simple and compact structure which shall be at the same time rugged and capable of maintaining proper alignment during heavy and prolonged usage.

Another object is to provide a simple control system by which the braking cylinders will run freely when not in service and will render a well-governed and effective braking action when brought into play.

Another object is to so arrange the braking cylinders and their pistons that the necessity for packing will be reduced to a minimum.

Another object is to provide means for supplying the braking cylinders with a compressed fluid in order to increase the braking effect whenever such increase is desired.

These and other objects, features and advantages of my invention will be more fully understood upon reference to the following detailed description taken in connection with the accompanying drawing, while the scope of the invention will be particularly pointed out in the appended claims.

In the drawing I have illustrated an internal combustion engine constructed and arranged in accordance with the present invention, parts being shown in central vertical section and other parts being broken away in order to clearly illustrate the same.

Referring to the drawing in detail, 10 and 11 designate the cylinders of the engine, 12 the crank shaft, 13 and 14 the pistons, 15 and 16 the connecting rods and 17 and 18 the cranks. These are all of the usual construction except that the various cranks are differently arranged on the crank shaft than usual. The construction shown includes six cylinders. The four intermediate cylinders 11 are driving cylinders and the connection of their connecting rods 16 to the cranks 18 is the same as is commonly found in a four cylinder engine. The end cylinders 10 are braking cylinders and the pistons 13 and connecting rods 15 are the same in construction as the corresponding parts of the driving cylinders, but the cranks 17 are arranged so as to oppose each other as the engine is operated. The driving cylinders are supplied with vaporized fuel through the intake manifold 19, and the exhaust gases are discharged through the exhaust manifold 20. Each cylinder is provided with a suitable intake valve 21, and a suitable exhaust valve 22. These valves may be operated in any desired way. Many valve gears are known in the art. Each driving cylinder 11 is also provided with a spark plug 23, one only being shown in the drawing.

The crank arrangement for the four driving cylinders 11 is one commonly employed in a four cylinder engine and the cranks of each pair of adjacent cylinders are opposed to each other. In other words the cranks of the first and second driving cylinders are positioned angularly 180 degrees apart, likewise the cranks of the third and fourth cylinders are positioned angularly 180 degrees apart. The arrangement is such that the second and third cylinders have coincident crank pins and the third and fourth cylinders have coincident crank pins.

In operation the arrangement is such that the cylinders may be fired in the order 1, 2, 4, 3 or in the order 1, 3, 4, 2, as desired. Thus if the firing be in the former order while piston 14 of the first cylinder is going down say on power the piston of the second cylinder 11 will be coming up on compression. At the same time the piston of the third cylinder will be coming up on exhaust and the piston of the fourth cylinder will be going down on suction. These operations are the usual ones and the four cylinders and the arrangement of the cranks in themselves constitute no part of the present invention. Their arrangement and cooperation with the braking cylinders 10, however, do involve the present invention.

It will be seen that the braking cylinders 10 have their piston rods 15 connected to crank pins on the cranks 17 which are disposed angularly 180 degrees apart. In the present instance the crank pin of the first braking cylinder is coincident with the crank pin of the first driving cylinder and the crank pin of the second braking cylinder is distant 180 degrees from the crank pin of the fourth driving cylinder. This arrangement, however, may be departed from, it only being necessary to maintain the cranks 17 so that the pistons 13 will move in opposition to each other. The crank shaft is journaled in bearings 24, forming part of the crank case 25, and in intermediate bearings 26, which form part of the frame 27 of the structure.

The upper ends of the braking cylinders 10 are connected to the outer ends of two connecting pipes 28, which extend toward each other and are fitted to the casing of a valve 29. When this valve is in its open position a direct communication between the upper ends of the cylinders 10 is provided and as the engine operates the air or other gases within the cylinders and the pipes passes back and forth from one cylinder to the other. The action of the pistons 13 is free and meets with no opposition. However, when valve 29 is moved to its closed position the operation of the pistons 13 causes the air or gases in the cylinders to be compressed as the piston in each case moves toward the ends of the cylinder and to be exhausted as the piston moves to the opposite end of its stroke. The valve 29 is provided with an arm 30, to which is connected a rod 31 leading to a suitable control point such as the dash-board of an automobile and by moving the rod to and fro the valve 29 may be opened and closed. It is placed in its open position when it is desired to run the engine as in driving, and it is moved to its closed position when it is desired to retard the engine and to produce a braking action. Each pipe 28 is provided with a safety or relief valve 32 which is set to open at a critical point so as to prevent the compression of the atmosphere or gas in the associated pipe from becoming excessive. Ordinarily the valves 32 will be set so that they will not open until the pressure becomes excessive and exceeds that which is necessary to a proper operation of the braking cylinders.

In addition to the control exercised by the valve 29 and the communicating passage through the pipes 28, I have arranged to supply each of the pipes 28 with a fluid under pressure such as compressed air. This is supplied in each instance through a pipe 33, controlled by a valve 34. The pipes 33 are connected to the pipes 28 in any suitable way and lead from some source of compressed air or gas. It seems unnecessary to illustrate means for providing such a supply as the same are well known in the arts and commonly employed in various connections. Each of the valves 34 is provided with an arm 35 which is connected to a rod 36 which leads to a suitable control point as the dashboard of an automobile. In operation not only am I able to bring about a braking action through the closing of the communicating passage between the braking cylinders 10, but I am enabled to increase the pressure within this passage by opening and closing the valves 34. Obviously these valves may be operated together either in accordance with the judgment of the user or the operating rods 36 may be connected so as to bring about such simultaneous action.

In the present instance I have shown crank shaft 12 provided with a fly wheel 37 and the upper cylinder casing is provided with a cooling jacket 38.

Obviously in carrying out my invention various cylinder arrangements may be employed. I therefore do not wish to be limited to the specific number of cylinders shown or to other illustrated details but aim to cover obvious modifications and alterations by the terms of the appended claims.

It will be noted that if it is desired to use the valve 29, alone, the valves 34, can be left in closed position and thus prevent the supply of fluid under pressure to the braking cylinders. Obviously these valves may be operated in different ways as will be apparent from the description heretofore given. It will also be noted that when the valve 29 is partially open the braking action will not be so decided as when the valve is closed. Attention may also be called to the point that when two braking cylinders are used in the way herein described and illustrated the only packing required is that upon the piston rings and it is not necessary to provide packing at other points as where a single braking cylinder is employed.

What I claim as new and desire to secure by Letters Patent of the United States is:

1. An engine comprising a crank shaft, a plurality of driving cylinders, asssociated braking cylinders, pistons for said driving and braking cylinders, connecting rods between said pistons and the cranks on said shaft, and a valve controlled communicating passage between said braking cylinders whereby the extent of braking action may be varied.

2. An engine comprising a crank shaft, a plurality of driving cylinders, associated braking cylinders, pistons for said driving and braking cylinders, connecting rods between said pistons and the cranks on said shaft, a valve controlled communicating passage between said braking cylinders whereby the extent of braking action may be varied, and relief valves for automatically reducing the pressure in said braking cylinders when it exceeds a certain critical amount.

3. An engine comprising a crank shaft, a plurality of driving cylinders, associated braking cylinders, pistons for said driving and braking cylinders, connecting rods between said pistons and the cranks on said shaft, a valve controlled communicating passage between said braking cylinders, and auxiliary means for supplying a fluid under pressure to said braking cylinders.

4. An engine comprising a crank shaft, a plurality of driving cylinders, associated braking cylinders, pistons for said driving and braking cylinders, connecting rods between said pistons and the cranks on said shaft, a valve controlled communicating passage between said braking cylinders, auxiliary means for supplying a fluid under pressure, and relief valves for automatically reducing the pressure in said braking cylinders when it exceeds a certain critical amount.

5. An engine comprising a crank shaft, a plurality of driving cylinders, associated braking cylinders, pistons for said driving and braking cylinders, connecting rods between said pistons and the cranks on said shaft, and means for supplying a fluid under pressure to said braking cylinders.

6. An engine comprising a crank shaft, a plurality of driving cylinders, associated braking cylinders, pistons for said driving and braking cylinders, connecting rods between said pistons and the cranks on said shaft, means for supplying a fluid under pressure to said braking cylinders, and means for controlling said supplying means from a distant point.

7. An engine comprising a crank shaft, a plurality of driving cylinders, associated braking cylinders, pistons for said driving and braking cylinders, connecting rods between said pistons and the cranks on said shaft, a valve controlled communicating passage between said braking cylinders whereby the extent of braking action may be varied, and means for controlling said supplying means from a distant point.

8. An engine comprising a crank shaft, a plurality of driving cylinders, associated braking cylinders, pistons for said driving and braking cylinders, and connecting rods between said pistons and the cranks on said shaft, the driving cranks having a given angular arrangement and the braking cranks being angularly arranged to oppose each other.

9. An engine comprising a series of cylinders structurally forming a unit, the two extreme cylinders being used for braking and the intermediate cylinders for driving, supply and exhaust valves and firing means for said driving cylinders, a crank case secured to said cylinders, a crank shaft journaled in said crank case, pistons and connecting rods for said cylinders, the latter connected to the cranks on said shaft, the driving cranks being angularly disposed for driving and the braking cranks being angularly disposed in opposition to each other, and a valve controlled communicating passage between said braking cylinders.

In testimony whereof, I hereunto subscribe my name this 14th day of September, A. D., 1922.

EDWARD H. MARTIN.